May 16, 1933.  N. TESTI  1,909,919
SAFETY RAZOR BLADE RECEPTACLE
Filed Aug. 12, 1932
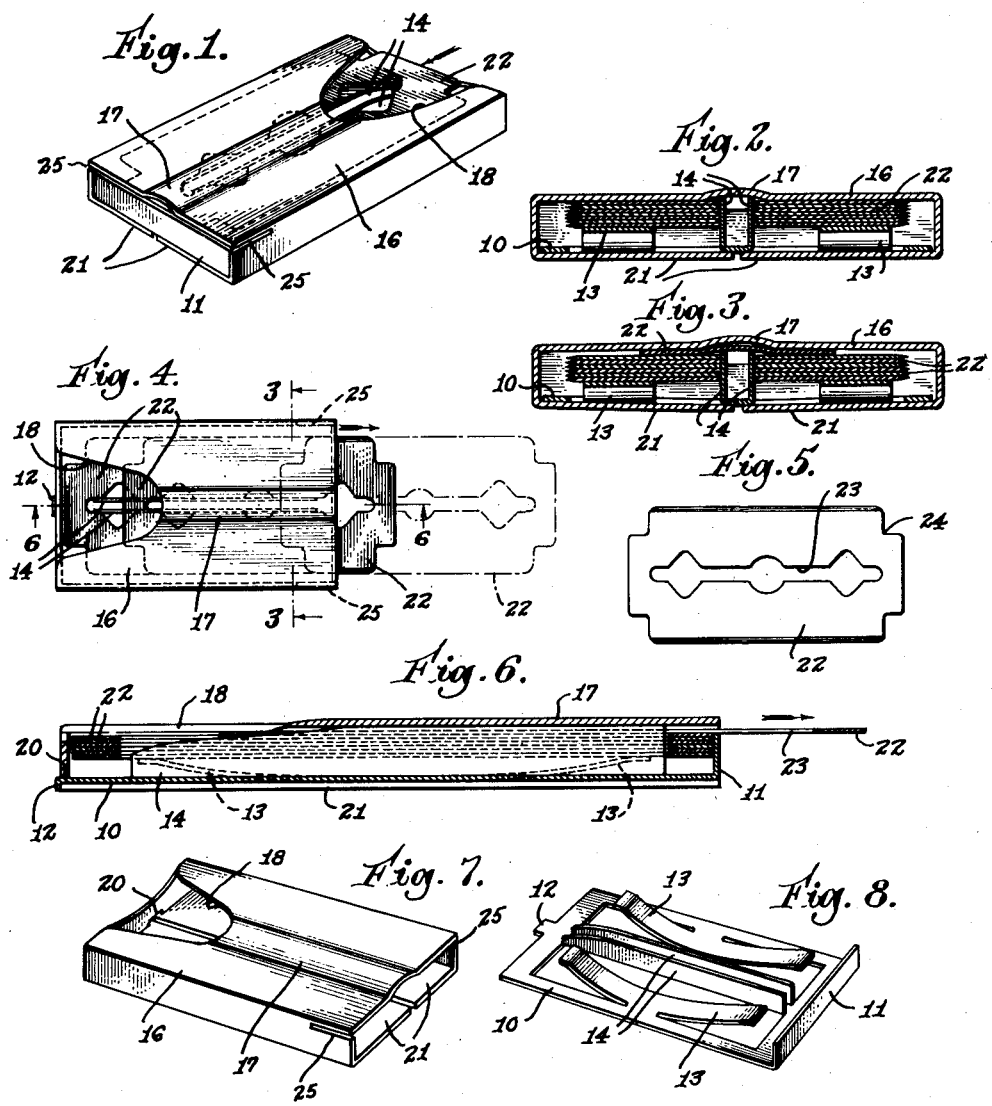
INVENTOR
Nicholas Testi.
BY
ATTORNEY Patented May 16, 1933

1,909,919

UNITED STATES PATENT OFFICE

NICHOLAS TESTI, OF NEW YORK, N. Y., ASSIGNOR TO GILLETTE SAFETY RAZOR COMPANY, OF BOSTON, MASSACHUSETTS, A CORPORATION OF DELAWARE

SAFETY RAZOR BLADE RECEPTACLE

Application filed August 12, 1932. Serial No. 628,492.

This invention relates to receptacles for holding thin flexible safety razor blades for purposes of sale and distribution or for the convenience of the user.

The receptacle of my invention is designed to hold a convenient number of blades, horizontally disposed one above another in a stack, securely and without danger of misplacing the individual blades and at the same time to maintain the cutting edges of the blades out of contact with the walls of the receptacle while the blades are contained therein or while being withdrawn one by one therefrom for use. The receptacle of my invention is particularly designed to contain blades having a longitudinal internal slot for locating purposes and to this end includes as an important feature a longitudinal rib adapted to engage and position the blades in the receptacle with their edges spaced from the walls thereof and positively prevented from rubbing contact which would tend to dull them.

My invention further contemplates the provision of a receptacle including in its construction a loading clip or magazine upon which the blades may be assembled and by means of which they may be inserted as a stack into the receptacle. The clip is designed to form a part of the complete and closed receptacle and to position the blades therein. In outline it is somewhat larger than the outline of the blades which it is to carry and the rib of the receptacle accordingly locates the blades within the confines thereof, so that the cutting edges of the blades are held out of engagement with the walls of the receptacle while being introduced upon the clip and while being maintained within the receptacle. The rib of the clip is adapted to be engaged by the top and bottom respectively of the receptacle, so that there is no possibility of blades being accidentally loosened and misplaced from the stack. The rib is tapered at one end, however, so that when the uppermost blade of the stack is advanced in being discharged from the receptacle it may pass over the top of the rib and for this purpose one of the walls of the receptacle is made resilient, so that it may yield and permit the passage of a blade.

Another feature of the invention consists in means for transversely curving the uppermost blade of the stack and thereby stiffening it while it is being withdrawn or discharged. As herein shown, this is effected by providing a longitudinal corrugation in the cover of the receptacle and yieldingly urging the stack of blades upwardly, so that the uppermost blade is curved somewhat into conformity with said corrugation, being thereby bent transversely and so stiffened against longitudinal bending or bending in the direction of discharge.

These and other features of the invention will be best understood and appreciated from the following description of a preferred embodiment thereof, selected for purposes of illustration and shown in the accompanying drawing, in which Fig. 1 is a view in perspective of the complete receptacle;

Fig. 2 is a view of the filled receptacle in cross-section on an enlarged scale;

Fig. 3 is a similar view showing one blade in process of removal from the receptacle;

Fig. 4 is a plan view of the receptacle, indicating different positions of the blade in process of withdrawal;

Fig. 5 is a plan view of one form of safety razor blade for which the receptacle is particularly adapted;

Fig. 6 is a view of the receptacle in longitudinal section and on an enlarged scale;

Fig. 7 is a view in perspective of the casing portion of the receptacle, and

Fig. 8 is a view in perspective of the clip portion of the receptacle.

The receptacle comprises two parts, both of which may be formed of sheet material, preferably thin sheet metal which may be formed by punching and die-bending into the requisite shape, although it is within the scope of my invention to utilize plastic material which may be moulded into shape. The clip or magazine member of the receptacle is best shown in Fig. 8. It is there represented as being formed of thin, sheet metal and is rectangular in outline and somewhat larger in dimensions than the blades for which it is intended. It comprises a rectangular base frame 10 having an upturned transverse flange 11 at one end and a short, centrally-disposed ear 12 at the other. The base is cut out to furnish the material for two parallel curved springs 13 disposed longitudinally in the base of the clip, connected at an intermediate point with the sides respectively of the base frame 10 and concave in contour, extending at both ends above the plane of the base. The center portion of the clip is provided with a pair of upstanding longitudinal flanges 14 spaced from each other and thus forming a double rib in the clip. The rib formed by the flanges 14 terminates within the ends of the base frame 10, being spaced at its forward end from the transverse flange 11, and being bevelled or downwardly tapered at its rear end toward the ear 12.

The receptacle herein disclosed is designed to contain slotted blades such, for example, as that shown in Fig. 5, and known to the trade as the "new Gillette blade". These blades 22 are sharpened at their opposite edges and are provided at each corner with a reentrant recess 24 which defines an elongated centrally-disposed portion. The blades are also provided with an interior slot 23 having spaced enlargements, and adapted to co-operate with a correspondingly-shaped rib or projections in the razor with which the blade is used for the purpose of locating the blade accurately in shaving position in the razor.

The clip shown in Fig. 8 is designed to receive a stack of blades, similar to the blade shown in Fig. 5, or blades provided with a similar slot, and the dimensions of the rib formed by the upturned flanges 14 of the clip are therefore made to correspond with the dimensions of the slot 23. Blades presented to the clip are located in position thereon and within the confines of the base frame 10 by the engagement of the rib with the slot of the blade. The blades as a stack are elevated above the base frame by the action of the springs 13.

The outer or casing member of the receptacle is shaped to receive and to enclose the clip with its stack of blades assembled therewith, as shown in Fig. 7. It also is formed of thin sheet material having a cover 16 provided with a central longitudinally-disposed corrugation 17 and a U-shaped recess 18 in its rear end. The side walls of the casing are provided with slots 25 extending inwardly from the front edge of the casing and being located in the assembled receptacle just above the edge of the transverse flange 11 of the clip. The bottom of the casing is supplied by two resilient sections 21, separated from each other by a narrow space. The casing is provided with a rear wall having a concave upper edge which registers with the recess 18 of the cover of the casing and provided in its lower edge with a rectangular notch 20 of proper dimensions to receive the ear 12 of the clip when the latter is assembled within the casing.

In supplying the receptacle with blades, the clip is loaded with a stack of blades piled one above another and these are pressed down in opposition to the action of the springs 13 of the clip to permit the assembled clip and stack to be pushed endwise into the open end of the casing. As the blades are released, the springs 13 tend to elevate the entire stack so that the uppermost blade is maintained yieldingly in contact with the cover part of the casing. The clip is pushed inwardly by means of its end flange 11 until the ear 12 passes through the notch 20 in the rear wall of the casing. When the clip has thus been positioned, the ear 12 is bent downwardly, as shown in Fig. 6, thus positively locking the clip and its supply of blades within the casing.

When it is desired to remove a blade from the receptacle for shaving or otherwise, the uppermost blade in the stack may be pushed forwardly by the thumb or finger of the user where it is accessible through the U-shaped opening 18 in the cover of the receptacle. By pressing the stack of blades upwardly, the springs 13 register the uppermost blade in alignment with the discharge slit which lies between the upper edge of the transverse flange 11 of the clip and the inner or lower face of the cover 17 of the casing. As a blade is advanced longitudinally, its rear end portion, beyond the slot 23, will travel up the gradual incline of the flanges 14 of the clip and finally, when the full height of the rib is reached, the bottom sections of the casing will spring slightly to permit the blade to be interposed between the top of the rib and the inner face of the cover of the casing. At the same time, the blade will be somewhat bowed into conformity with the longitudinal corrugation 17 in the cover of the casing and thereby considerably stiffened against buckling in the direction of its movement. On the other hand, the resilient action of the casing provides a frictional drag upon the blade being discharged, rendering its removal smooth and convenient. There is, moreover, no danger of accidental removal or displacement of the blades since they are positively empaled upon the rib of the clip and held in place thereon by being engaged above by the cover of the casing which, it will be noted, directly engages the top edge of the rib, and below by the spaced springs 13.

Having thus described my invention, what I claim as new and desire to secure by Letters Patent of the United States is:—

1. A receptacle for holding slotted razor blades, including a clip having a flat base with an upstanding rib centrally disposed therein and a transverse retaining flange spaced therefrom, and an open ended casing shaped to enclose the clip and to provide a discharge slit for blades above the flange of the clip.

2. A receptacle for holding slotted razor blades, including a clip having spaced upstanding flanges constituting a rib for centering a stack of blades in the clip, springs for moving the blades upwardly upon the rib, and an open ended casing for receiving the clip and its blades and having a cover which is engaged by the uppermost blade of the stack.

3. A receptacle for slotted razor blades including a clip having a centrally-disposed longitudinal rib for centering a stack of blades in the clip, and a casing having upper and lower walls arranged to yield away from each other and normally engaging the opposite edges of the rib of the clip.

4. A receptacle for slotted razor blades including a clip having a longitudinal rib therein, and a casing having a cover and bottom comprising resilient sections, said cover and bottom being positively spaced apart by the rib of the clip and yielding to permit a blade to be drawn from the casing above the rib.

5. A receptacle for slotted blades having means for holding a stack of blades with their edges out of contact with the walls of the receptacle, a cover with a longitudinal corrugation therein and a discharge opening in one end, together with means for transversely curving the uppermost blade in the stack by pressing it into conformity with the corrugated cover so that it may be transversely curved and thereby stiffened against longitudinal bending when advanced through the discharge opening.

NICHOLAS TESTI.